United States Patent [19]
Heimbrand

[11] 3,946,777
[45] Mar. 30, 1976

[54] EDGE MACHINING TOOL CONSTRUCTION

[75] Inventor: Eberhard Heimbrand, Horb, Germany

[73] Assignee: Ledermann & Co., Horb, Germany

[22] Filed: Sept. 30, 1974

[21] Appl. No.: 510,544

[30] Foreign Application Priority Data
Sept. 28, 1973 Germany............................ 2348731

[52] U.S. Cl................ 144/90 A; 144/218; 144/237; 29/104
[51] Int. Cl.².................... B27G 13/12; B23D 13/00
[58] Field of Search .......... 144/90 A, 90, 218, 222, 144/231, 233, 236, 237; 29/104, 105 R, 103 R

[56] References Cited
UNITED STATES PATENTS

| | | | |
|---|---|---|---|
| 984,407 | 2/1911 | Wolvin............................ | 144/90 A |
| 987,391 | 3/1911 | Mitchell............................ | 144/90 A |
| 987,479 | 3/1911 | Mitchell............................ | 144/90 A |
| 996,034 | 6/1911 | Zimmerman...................... | 144/90 A |

*Primary Examiner*—Donald R. Schran
*Attorney, Agent, or Firm*—Walter Becker

[57] ABSTRACT

An edge machining tool in which two substantially identical tool members are mounted on a work spindle with each tool member having peripheral axial portions extending into notches in the other tool member. The aforementioned axial portions are provided with cutting edges and incline downwardly toward the other tool member so that in cross section the tool members define a "V" shape therebetween. At least one threaded adjusting spindle is provided which is held against axial movement on the work spindle and which engages the tool members with threads of respective hand so that by rotation of the adjusting spindle the tool members can be caused to move toward and away from each other on the axis of the work spindle.

10 Claims, 4 Drawing Figures

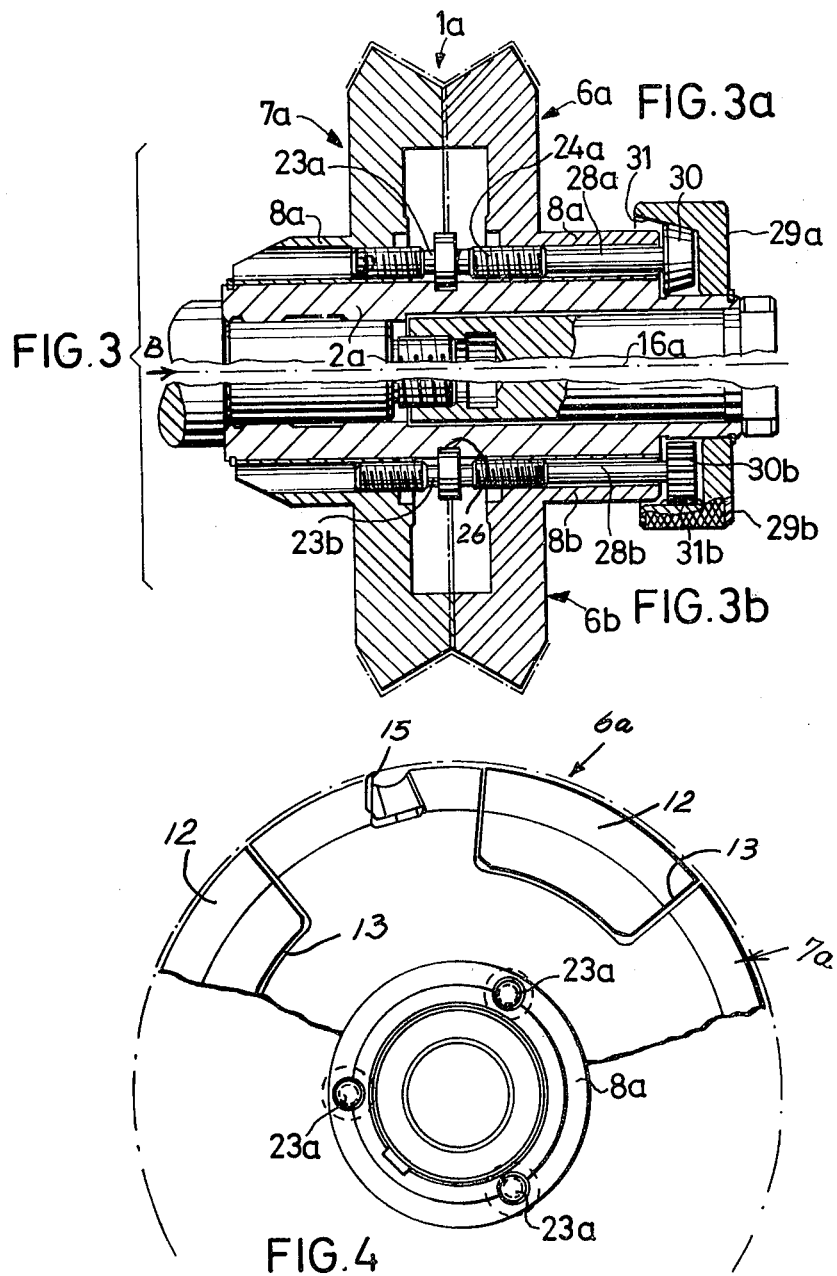

EDGE MACHINING TOOL CONSTRUCTION

The present invention relates to a tool construction for machining edges, especially workpieces such as veneer plates, thin plates with a cover thereon of synthetic material, or the like, which cause different tool wear over the thickness of such plates and which are provided with two adjacent individual tools which are arranged on a tool carrier and in the direction of their tool axes have overlapping working zones. At least one of said individual tools is adjustably mounted in the direction of the tool axis on guiding means of a tool carrier to be arranged on a working spindle, said adjustability being effected by means of an adjusting element engaging a counter-element.

It is an object of the present invention so to design an edge machining tool of the general type set forth above, that high working precision and easy adjustability as well as a simple construction will be assured.

These and other objects and advantages of the invention will appear more clearly from the following specification, in connection with the accompanying drawings, in which:

FIG. 3 illustrates an axial section through a modification of the construction of FIGS. 1 and 2.

FIG. 4 shows the tool construction of FIG. 3, as seen in the direction of the arrow B.

The edge machining tool construction according to the invention which comprises individual tools arranged on a tool carrier of which individual tools at least one is adjustably mounted on guiding means by means of an adjusting element engaging a counterelement, is characterized primarily in that the adjusting element is formed by at least one adjusting spindle arranged in spaced relationship to the tool axis. With a tool construction according to the present invention it is possible over an adjusting element located along the tool axis to realize a considerably better guiding and holding of the individual tools, and to do this even with a very short construction of the machining tool. Furthermore, the adjusting spindle may form the only connecting element between the tool carrier and the respective individual tool so that in view of the low number of individual elements, very high precision can be realized.

Figure 1:
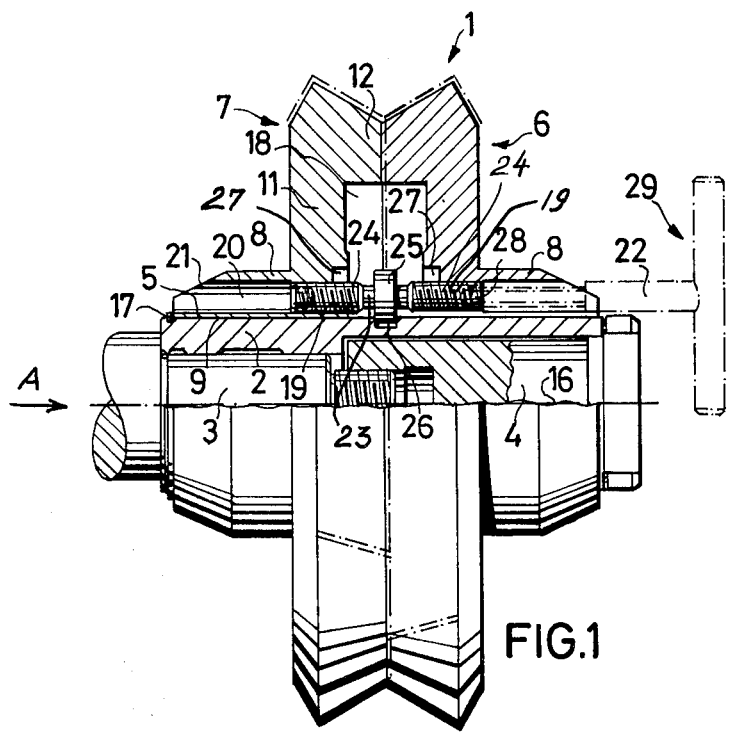
FIG. 1 is a machining tool construction according to the invention, partially in section and partially in side view.
Figure 2:
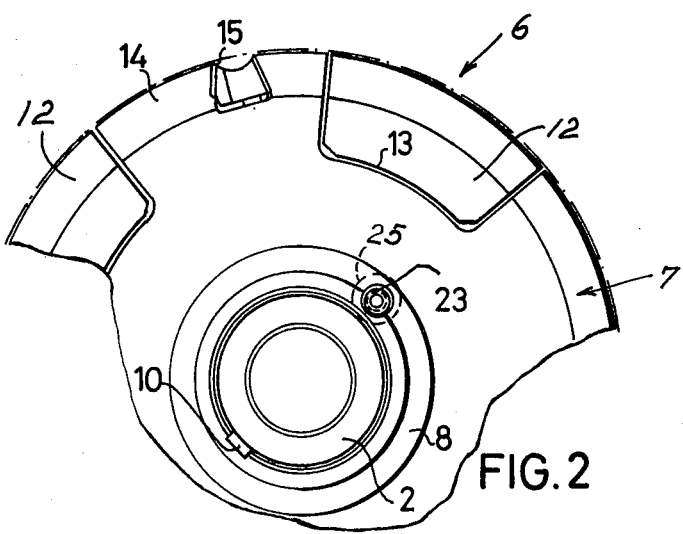
FIG. 2 is a view of FIG. 1, as seen in the direction of the arrow A.

Referring now to the drawings in detail, FIGS. 1 and 2 show a machining tool construction 1 with a sleeve-shaped tool carrier 2 which by means of its bore can be placed upon the working spindle 3 of a woodworking machine, or the like. A clamping sleeve 4 provided with an inner thread is, from the front end, inserted into the tool carriers 2. Sleeve 4 rests by means of a key collar against the pertaining end face of the tool carrier 2 and by means of its inner thread is screwed onto a threaded extension at the end of the working spindle 3.

The outer circumference of the tool carrier 2 which is cylindrical over its entire length forms a guiding means 5 for two individual tools 6, 7 which by means of bores 9 provided in hubs 8 are axially slidably movably mounted on the guiding means 5 and by means of wedges 10 engaging grooves are secured against distortion. The wall thickness of hubs 8 corresponds approximately to the maximum wall thickness of the tool carrier 2. Those ends of the hubs 8 which face each other, merge with an annular disc-shaped tool body 11. The tool bodies 11 comprise within the region of the outer circumferential zone extensions 12 which project from those sides thereof which face each other. Within the region of these extensions 12, each tool body is provided in a star-like manner with annular segmental recesses 13 which extend over the entire axial extensions of the respective tool body. Between said recesses 13 there are provided corresponding annular segmental projections 14 having approximately the same arc angle. These projections are at those sides thereof which face the respective other individual tool provided with extensions 12 which respectively engage or enter a recess 13 of the other individual tool. Cutting edges 15 on the projections 14 extend over the entire axial extension of the outer circumference of the respective individual tool. These cutting edges 15 are in the form, for instance, of exchangeable cutting plates which project over the outer circumference of the individual tools 6, 7 and form the working zones of said tools. The working zones of the two individual tools 6, 7 overlap each other in the direction of the axis 16 of the tool 1.

When the two individual tools 6, 7 are moved out to their greatest possible extent, the said working zones just still overlap each other while those ends of the hubs 8 of the individual tools which face away from each other will be located near to the two end surfaces of the tool carrier 2, and while the hub 8 adjacent the machine with its end surface engages an abutment 17 of the tool carrier 2 which abutment may be formed, for instance, by a spring ring. From this position, the individual tools 6, 7 can be moved axially approximately by the working width of an individual tool toward each other. A very safe and stabile guiding of the respective individual tools 6, 7 for limiting round and plane running errors to a minimum is realized by having the hub 8 of the respective individual tools 6, 7 project on that side which faces away from the individual tool beyond the remaining individual tool and that the respective individual tool 6, 7 is guided on the guiding means 5 over the entire length of its hub 8 which preferably forms one piece with the respective individual tool.

Those end faces of said tool bodies 11 of the two individual tools, which are facing each other are provided with depressions extending up to the extensions 12, said depressions forming a chamber 18 between the individual tools 6, 7. Furthermore, the hubs 8 of the individual tools 6, 7 are provided with threaded bores 19 which are in alignment with each other and the diameters of which are less than the wall thickness of the hubs and for example may amount only to one-sixth of the diameter of the guiding means 5. These threaded bores 19 are located approximately within the axial region of the annular disc-shaped tool bodies 11, and within the region of the respective hub 8 merge with a bore 20 which is in alignment with said bores 19, said bores 20 extending to the end of the pertaining hub 8.

Directly adjacent to the guiding means 5 is an adjusting spindle 23 located along the axis 22. The spindle 23 is located in the hubs 8 of the individual tools 6, 7 whereby a protected arrangement and an easy accessibility will be realized.

For purposes of obtaining a simple construction, it is as a rule advantageous when the adjusting spindle 23 includes a pitch element, for instance, at least one threaded section 24, preferably threaded sections 24, for both individual tools, which last mentioned threaded sections have an opposite pitch so that when turning the adjusting spindle 23 both individual tools will be adjusted in opposite direction and symmetrically or non-symmetrically to each other in the threaded sections 24 may be designed as fine or coarse thread. The equally long threaded sections 24 engage the threaded bores 19 which are designed as counterelements, and have opposite equal or unequal pitch. Inasmuch as the respective thread section 24 is formed by an outer thread, the adjusting spindle 23 may be designed substantially solid and with a very small outer diameter, and the counterelement may in a simple manner be designed as a threaded bore 19 so that no separate part will be required on the individual tool 6 or 7 for the counterelement. The adjusting spindle 23 is by means of axial safety element 25 preferably with an annular collar engaging the groove, axially secured with regard to one of the two parts adjustable counter to each other, particularly with regard to the tool carrier 2, so that with a simple construction, a precise location of the adjusting spindle 23 and thus of the individual tools relative to the tool carrier 2 will be assured. This axial safety element 24 simultaneously forms the single axial safety element for axially securing the respective individual tools 6, 7 relative to the tool carrier 2 in its respective adjusting position. The axial safety element is arranged between the thread sections 24 which together take up more than half the total length of the threaded spindle 23, namely, approximately two-thirds thereof. The axial safety element forms one piece with the adjusting spindle 23 while its axial extension is by about one-half less than the distance between the threaded sections 24, and its outer diameter is greater than the outer diameter of the threaded sections 24.

Inasmuch as the axial safety element 25 is provided in particular in the center between the threaded sections 24 preferably having the same length, the adjusting spindle can equally well be mounted in two positions offset with regard to each other and can be designed symmetrically with regard to the center of its length.

The adjusting spindle 23 thus for obtaining a protected arrangement is located substantially completely within the individual tool 6, 7. The axial safety element 25 engages with its circumferential section that faces the tool axis 16, a groove 26 provided in the guiding means 5. This groove 26 may be formed by an annular groove around the tool axis 16 or by a rectilinear groove slot which is at a right angle to the rotor axis 16. At least in the first mentioned instance, an additional safety device against turning is provided for the respective individual tools 6, 7 relative to the tool carrier 2. The axial safety element 25 is for purposes of obtaining a compact design within the hollow chamber 18, located between the individual tools 6, 7 which at those end faces thereof that face each other have annular depressions 27 extending to their bores 9. The diameter of said depressions 27 is slightly greater than the distance of that side of the member 25 which faces away from the tool axis 16, so that the member 25 can unimpededly emerge in the depressions 27. The bottom surfaces of the depressions 27 are passed through by threaded bores 19. The adjusting spindle 23 is thus located substantially completely within the individual tools 6,7 for obtaining a protected arrangement.

At the respective end formed by a threaded section 19, the adjusting spindle 23 has a connecting element 28 in the form, for instance, of an inner hexagon so that the adjusting spindle 23 does not have to be accessible between its ends. For purposes of turning the adjusting spindle 23, there is provided an actuating element 29 in the form of a socket wrench which through the respective bore 20 can in a disengaging manner be brought into engagement with the pertaining connecting member 28 so that then the adjusting spindle 23 will be turnable and the actuating element is, during the working with the tool, withdrawn from the latter so that an accidental adjustment is completely impossible.

During the turning of the adjusting spindle 23, the individual tools 6, 7 are moved toward each other or away from each other. In the first mentioned instance the individual tools can be displaced until the end faces adjacent to their depressions 27 are engaged. Through the openings or bores 20, the adjusting spindle 23 is likewise easily accessible from both ends and is simple to install. Also, the actuating element is safely guided in bore 20 and can be brought into engagement with the adjusting spindle.

The design according to the invention also makes it possible that the two individual tools 6, 7 are completely or nearly completely identical as to all details and therefore can be exchanged at will.

According to the arrangement of FIG. 3, above the tool axis 16a there is illustrated a second embodiment of the invention, whereas below the tool axis there is illustrated a third embodiment of the invention. For the second embodiment according to FIGS. 3 and 4, corresponding parts have been designated with the same reference numerals as in FIGS. 1 and 2, but with the additional character $a$, whereas for the third embodiment these reference numerals have been employed with the additional character $b$.

According to the embodiment of FIGS. 3 and 4, three adjusting spindles are preferably uniformly arranged about the tool axis 16a. The adjusting spindles are uniformly distributed around the tool axis 16a which spindles are all rotatable by a common actuating element.

According to the second embodiment of the invention, the adjusting spindles 23a have those thread sections 24a which are further removed from that end of the tool 1a located on the machine side provided with connecting members 28a which are in alignment with the thread sections 24a. These connecting members 28a are formed by cylindrical spindle sections which form one piece with the adjusting spindles and are passed through the hub 8a of the pertaining individual tool 6 toward the outside. Directly adjacent to the end surface of this hub 8a, each connecting member 28a has a runner 30 which tapers and is, for instance, in the form of a frictional cone located at the outer circumference of an end section of the tool carrier 2a, which end section is reduced in daimeter. Axially secured and rotatable on said end section is the annular actuating element 29a which has a conical inner ring 31 forming a frictional surface. The inner ring 31 extends over the runners 30 as well as over the end of hub 8a and engages the runners 30 so that the latter will, during the rotation of the cap-shaped actuating element 29a which latter may be knurled at its outer circumference, be taken along, and a plurality of all of the adjusting spindles 23a are simultaneously synchronously turned. Since the actuating element 29a is mounted on the tool, preferably along its axis on the tool carrier 2a, the actuating element 29a may during the working operation remain on the tool, and a very quick adjustment will be possible.

With the third embodiment of the invention, instead of friction cones, pinions 30b are provided which engage a cylindrical inner gear ring 31b of the actuating element 29b and thus are positively taken along. At those ends of the adjusting spindles 23a, 23b which face away from the actuating element 29a, 29b, the adjusting spindles 23a, 23b, may comprise connecting elements identical to those comprised by the adjusting spindle according to FIGS. 1 and 2 so that they will also be accessible by socket wrenches.

As will be evident from the above, in view of the design according to the invention, in addition to a high rounded and plane running precision, also a highly quiet running of the tool can be realized. Furthermore, the tool has expediently a closed form for safety technical reasons, because substantially all parts are nearly completely arranged within the individual tools or are covered by correspondingly protective parts such as the cap-shaped element 29a, 29b, so that they are covered toward the outside.

It is, of course, to be understood that the present invention is, by no means, limited to the specific showing in the drawings, but also comprises any modifications within the scope of the appended claims.

What is claimed is:

1. An edge machining tool especially for machining the edges of panels which comprises: a pair of disc-like tool members in adjacent coaxial relation and having cutting element means on the periphery thereof, a work spindle supporting said tool members and operable to drive the tool members in rotation, each said tool member having axial portions axially overlapping the other tool member, and at least one adjusting member connected to said tool members and operable for adjusting said tool members relatively in the axial direction on said work spindle, said adjusting member comprising a threaded spindle having a thread portion threadably engaging each tool member, said threaded portions having threads of respectively different pitch thereon, a collar on said threaded spindle disposed between said tool members, and recess means in said work spindle engaging opposite axial sides of said collar.

2. An edge machining tool according to claim 1 in which said threaded portions have threads of respectively opposite hand thereon.

3. An edge machining tool according to claim 2 in which said tool members comprise recesses for receiving said collar, said collar being centered between said tool members.

4. An edge machining tool according to claim 1 in which each tool member has a hub portion thereon, said work spindle extending completely through both of said hub portions and supportingly engages said hub portions.

5. An edge machining tool according to claim 4 in which said work spindle engages substantially the entire length of the hub portions of each tool member.

6. An edge machining tool according to claim 1 in which said tool members are substantially identical.

7. An edge machining tool according to claim 1 in which each tool member has peripheral axial notches to receive the axial portions of the other tool member, the cutting element means on each tool member being located on the said axial portions thereof.

8. An edge machining tool according to claim 7 in which said tool members when viewed in cross section define a "V" shape therebetween.

9. An edge machining tool according to claim 1 in which said work spindle includes recess means engaging the periphery of said collar to prevent axial displacement of said threaded spindle on said work spindle.

10. An edge machining tool according to claim 2 in which the threads on said threaded portions of said threaded one of opposite hand and equal pitch whereby said tool members when adjusted move equal amounts in respective directions.

* * * * *

UNITED STATES PATENT OFFICE
CERTIFICATE OF CORRECTION

Patent No. 3,946,777     Dated March 30, 1976

Inventor(s) Eberhard Heimbrand

It is certified that error appears in the above-identified patent and that said Letters Patent are hereby corrected as shown below:

-- [73] Assignee: Ledermann + Co., Horb, Germany --.

Signed and Sealed this

Twenty-first Day of September 1976

[SEAL]

Attest:

RUTH C. MASON
*Attesting Officer*

C. MARSHALL DANN
*Commissioner of Patents and Trademarks*